United States Patent [19]

Abraham

[11] Patent Number: 4,644,984
[45] Date of Patent: * Feb. 24, 1987

[54] SELF SERVICE GAS CAP

[76] Inventor: Samuel R. Abraham, 3521 NW. 54 #291, Oklahoma City, Okla. 73112

[*] Notice: The portion of the term of this patent subsequent to Oct. 1, 2002 has been disclaimed.

[21] Appl. No.: 780,754

[22] Filed: Sep. 27, 1985

Related U.S. Application Data

[63] Continuation-in-part of Ser. No. 560,618, Dec. 12, 1983, Pat. No. 4,544,007.

[51] Int. Cl.$^4$ .............................................. B65D 51/24
[52] U.S. Cl. .............................. 141/392; 220/DIG. 33
[58] Field of Search ........................... 141/1, 209, 392; 220/DIG. 33; 222/566

[56] References Cited

U.S. PATENT DOCUMENTS

| | | | |
|---|---|---|---|
| 3,113,599 | 12/1963 | Trotter | 141/392 |
| 4,236,552 | 12/1980 | Rayboy | 141/98 |
| 4,278,116 | 7/1981 | Opp | 141/392 |
| 4,320,853 | 3/1982 | Moore | 220/DIG. 33 |
| 4,497,419 | 2/1985 | Reitzel | 220/DIG. 33 |
| 4,544,007 | 10/1985 | Abraham | 141/392 |

Primary Examiner—Henry K. Artis
Assistant Examiner—Mark Thronson
Attorney, Agent, or Firm—Robert K. Rhea

[57] ABSTRACT

The filler neck gas cap of a vehicle owner is utilized as a prop for maintaining the lever of a gasoline pump dispensing nozzle in open position without the necessity of manual operation.

Recesses are formed in the periphery or on the end surface of the gas cap for nesting an intermediate portion of the gasoline pump dispensing nozzle operating lever or its guard when the gas cap is interposed therebetween. Resilient padding material within the respective recess increases the coefficient of sliding friction between the gas cap and the dispensing nozzle components when operatively connected therewith to maintain the gas cap in a desired position.

1 Claim, 7 Drawing Figures

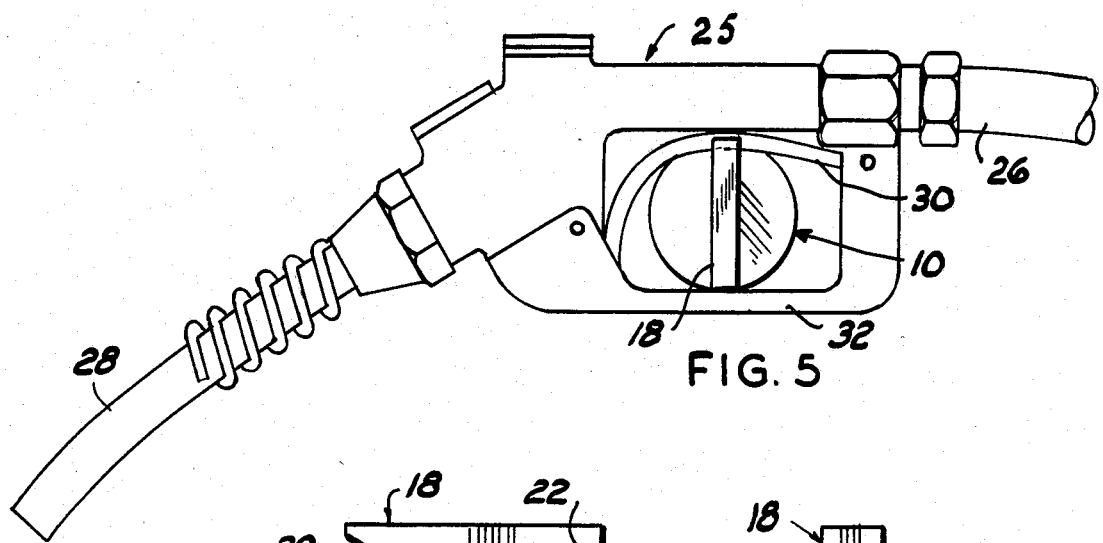
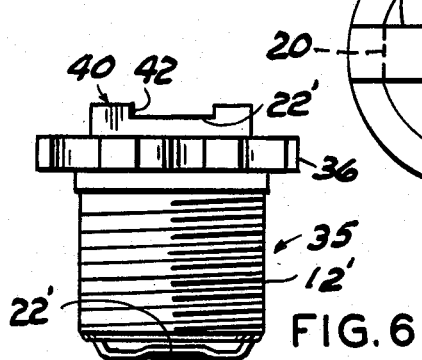
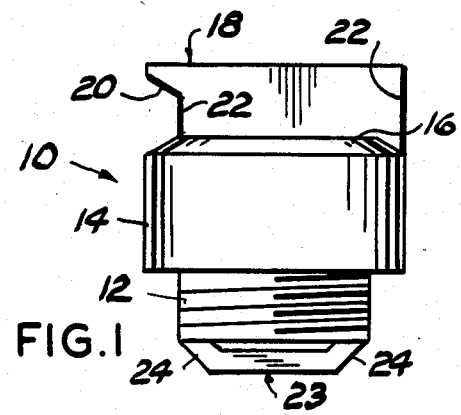
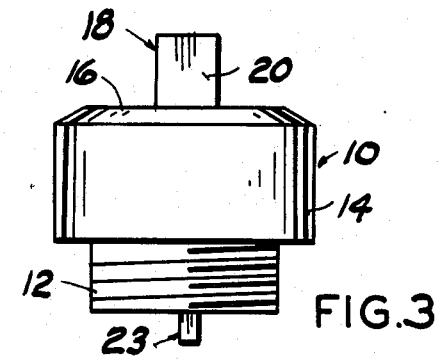
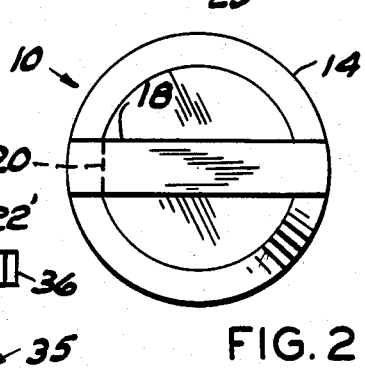
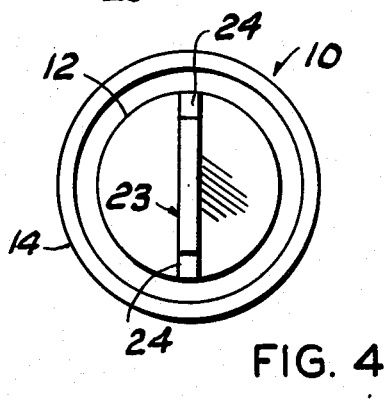
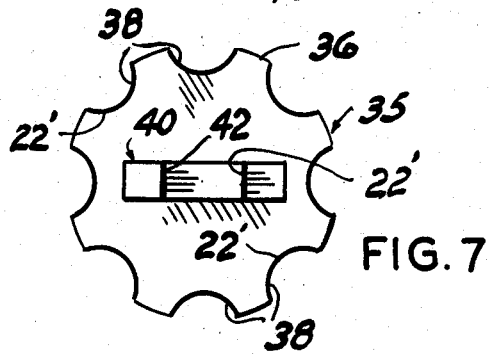

SELF SERVICE GAS CAP

The present invention is a continuation-in-part of an application filed by me in the U.S. Patent and Trademark Office on Dec. 12, 1983 under Ser. No. 06/560,618 for Vehicle Gasoline Tank Cap For Gasoline Pump Flow Control, now Pat. No. 4,544,007.

BACKGROUND OF THE INVENTION

1. Field of the invention.

The present invention relates to gasoline tank caps and more particularly to a particular structure therefor enabling the cap to be used as an aid in dispensing gasoline from a gasoline pump nozzle.

At present most vehicle gasoline service stations provide self-service gasoline pumps which, for economical reasons, have become quite popular, however, because of the volatile properties of gasoline considerable gasoline vapors are present in the vicinity of the normally hand held gasoline pump dispensing nozzle during the time gasoline is being dispensed from the pump into the vehicle gas tank. The gasoline vapors are obnoxious to most individuals as well as possibly presenting a potential health hazard from breathing the vapors thereof. This is particularly true of those individuals who suffer from emphysema and/or asthma in which even one breath of gasoline vapors will trigger an asthmatic attack. Some self-service gasoline pump nozzles are equipped with a tank filled back pressure released latch which permits the vehicle owner to stand laterally or upwind from the vapors while the tank is filling, however, many municipalities have an ordinance against use of the latch by the general public.

It is, therefore, highly desirable that some means be provided wherein gasoline vapors from a pump dispensing nozzle are minimized in contacting a vehicle owner while filling his tank. This invention provides such a device.

2. Description of the prior art.

Prior patents generally disclose pocket size generally planar metallic members having opposing surfaces for wedging the device between a gasoline pump nozzle dispensing lever and a portion of the nozzle bracket or lever guard to maintain the lever in fluid dispensing position.

U.S. Pat. No. 4,278,116 is a good example of such prior art devices having a plurality of wedge-shape shoulders and opposing parallel surface portions on its periphery adapted to be interposed between the gasoline nozzle dispensing lever and its guard for dispensing gasoline at a predetermined rate.

U.S. Pat. No. 4,236,552 is another example of a gas cap pump lever holding device. This patent features a C-shaped clip attached to the normally outward end of a gas cap for extending between the tubular body of a pump nozzle and its opening lever to hold the lever juxtaposed with the pump tube. Such an arrangement does not compensate for different manufacturer's models of gas nozzles in which the spacing between the pump lever and its guard is different between different pump nozzles thereby not maintaining each and every pump nozzle in fully open gas dispensing position. While devices of this type, as disclosed by the prior art, have generally been satisfactory the type, not a part of the gas cap, have not come into general use principally, it is believed, for the reason they are not readily available for use when needed, being easily misplaced either in the vehicle, left at the owner's residence or in the possession of another family member.

This invention is distinctive over the above and other similar patents by equipping a vehicle gas tank cap with external resilient attachments for use as a prop or support for maintaining the lever of a gasoline dispensing nozzle in opened position, the gasoline tank cap obviously being readily available each time the tank is to be filled.

SUMMARY OF THE INVENTION

One feature common to all of the gasoline pump dispensing nozzles of which I am aware comprise a variable position valve opening and closing lever protected by a lever guard in substantially gun trigger fashion in which the lever is manually moved in one direction for opening the valve and is spring biased closed when released. The spacing between the lever and its guard, when in valve open position, is sufficient to admit most vehicle gasoline tank caps either diametrically across its periphery or longitudinally between its ends. The gasoline caps of this invention are substantially conventional in general appearance being cylindrical and provided with screw threads or of the bayonet type and provided with holding clips.

In another embodiment a recess in an outer end portion of the cap engages the pump lever to maintain it in spaced relation with its guard by interposing the outer end portion of the gas cap between the lever and its guard. A transverse mounting handle on the normally inward end of the gas cap facilitates the gas cap replacement and its removal from the gas pump lever open biasing action. The gas cap may be axially interposed between the lever and its guard.

Alternatively the periphery of the gas cap may be provided with a plurality of oppositely disposed indentations or recesses for respectively engaging the pump lever and its guard. Surfaces of the gas cap to be placed in contact with the pump lever or its guard preferably have inert resilient material bonded to or molded therein to increase the coefficient of friction between the gas cap and the pump nozzle components and to minimize any possibility of sparks.

The principal object of this invention is to provide a fuel tank cap capable of being interposed between the pump nozzle opening lever and its guard of a gasoline service station to maintain the pump nozzle in open fuel dispensing and tank filling position to permit the operator to remain in a position remote from the fuel pump nozzle and avoid the noxious fuel fumes released to the atmosphere while the fuel tank is being filled.

BRIEF DESCRIPTION OF THE DRAWINGS

FIG. 1 is a side elevational view of a gas tank cap illustrating one embodiment of the invention;

FIG. 2 is a top view of FIG. 1;

FIG. 3 is a left side elevational view of FIG. 1;

FIG. 4 is a bottom view of FIG. 3;

FIG. 5 is a fragmentary side elevational view, to a different scale, of a conventional gasoline pump dispensing nozzle having the device of FIG. 1 in operative position thereon;

FIG. 6 is a side elevational view of another embodiment; and,

FIG. 7 is a top view of FIG. 6.

DESCRIPTION OF THE PREFERRED EMBODIMENTS

Like characters of reference designate like parts in those figures of the drawings in which they occur.

In the drawings:

The reference numeral 10 indicates a substantially conventional gas cap modified in accordance with the present invention. The gas cap 10 comprises an externally threaded cylindrical stem portion 12 which is cooperatively received by the filler neck of an automotive gasoline tank, not shown. The normally outward end portion of the stem 12 is surrounded by a cylindrical skirt 14 having a closed normally outward end 16. A torque handle 18 is transversely secured to the outwardly disposed skirt end 16. The torque handle 18 is generally rectangular having a length substantially equal with respect to the diameter of the skirt 14 and a thickness sufficient to prevent bending or twisting of the handle when used to manually insert or remove the gas cap from the filler neck. The width of the handle 18, the distance projecting axially from the closed end 16, is at least equal to the transverse dimension of a gas pump nozzle opening lever for the reasons presently explained and which permits manually grasping and angularly rotating the gas cap 10. One end of the handle 18 is provided with a recess 20 extending transversely of its width. The surface, defining the recess and the opposite end surface of the torque handle 18, are each coated with or have bonded thereto a layer of inert resilient material, indicated by the heavy lines and the numeral 22.

The opposite end of the gas cap 10 is provided with a diametric mounting handle 23 parallel with the torque handle 18. As shown in the drawings, the mounting handle 23 is generally rectangular in transverse section but obviously may be rod-like. The handle 23 extends in close spaced relation with respect to the normally inwardly disposed end surface of the gas cap and is integrally connected at its respective end portions 24 at diametrically opposite positions of the inward end surface of the gas cap threaded portion 12. The purpose of the mounting handle 23 is to permit manual angular rotation of the gas cap when positioning its torque handle 18 between the gas pump nozzle opening lever and its guard, as presently explained.

The term "resilient material", as used herein, includes natural or synthetic rubber having a surface generally referred to as "soft", which yields to manually applied pressure and has a relatively high coefficient of sliding friction when compared with hard or metallic surfaces.

The numeral 25 indicates a gasoline pump dispensing nozzle connected with a gasoline pump, not shown, by a length of flexible hose 26 and includes a valve mechanism, not shown, between the hose and dispensing nozzle 28 opened and closed by a manually operated lever 30 longitudinally spanned by a lever guard 32. Manual movement of the lever away from its guard 32 opens the nozzle valve mechanism and a spring means contained by the nozzle mechanism moves the lever toward its guard 32 to close the valve mechanism upon release of the lever.

The gas cap 10 is positioned on the gasoline pump nozzle, as shown by FIG. 5, by inserting the nozzle 28 in the gas tank filler neck, manually lifting the lever 30 away from its guard 32 so that the gas cap torque lever 18 may be longitudinally interposed between the pump lever 30 and its guard 32. As mentioned hereinabove, this is accomplished by manually grasping the mounting lever 23 and positioning the torque lever recess 20 in underlying contact with an intermediate portion of the lever 30 and angularly rotating the gas cap 10 until the other end of the handle 18 contacts the surface of the lever guard facing the lever. The gas cap 10 then maintains the pump nozzle in open position.

The other embodiment of the gas cap, indicated at 35 (FIGS. 6 and 7), is similarly provided with a cylindrical externally threaded portion 12'. The normally outwardly disposed end of the gas cap is provided with an annular outstanding flange 26 diametrically larger than the externally threaded portion 12'. The periphery of the flange 36 is provided with a plurality of diametrically opposite indentations or recesses 38 capable of respectively nesting an intermediate portion of the pump nozzle lever 30 and its guard when interposed therebetween. This gas cap is similarly provided with a torque lever 40 similar to the torque lever 18 but having a length not greater than the diameter of the threaded portion 12'. Medially it ends, the torque lever 40 is provided with a longitudinally extending recess 42 for the purposes presently explained.

The opposite or normally inwardly disposed end of the gas cap 35 is similarly provided with a manually grasped mounting handle 44 for positioning the recesses 38 of the flange 36 between the lever 30 and its guard 32. The mounting handle 44 is bent inwardly medially its ends toward the adjacent end of the cap to form a recess or notch 46. This permits the gas cap 35 to be axially disposed between the lever 30 and its guard 32 wherein the torque handle recess 42 nests an intermediate portion of the lever 30 and the mounting handle notch 46 nests an adjacent portion of the lever guard 32. In this embodiment the recesses 38, 42 and notch 46 are similarly provided with a layer of the resilient material similarly indicated by the heavy lines 22'.

Obviously the invention is susceptible to changes or alterations without defeating its practicability. Therefore, I do not wish to be confined to the preferred embodiment shown in the drawings and described herein.

I claim:

1. In a gasoline pump elongated dispensing valve nozzle having a laterally spaced longitudinally extending lever guard and having a variable position lever movable toward and away from the lever guard for dispensing and interrupting gasoline flow from the nozzle in combination with a vehicle gasoline tank filler neck gas cap having circular outer and inner end portions and having a diametric or axial dimension freely received between said lever and the lever guard when the lever is moved toward gasoline dispensing position, the improvement comprising:

a rectangular torque handle diametrically secured to the normally outward end surface of the gas cap, said torque handle having a recess in one surface capable of nesting an intermediate portion of said valve nozzle lever;

a mounting handle, having opposite ends, diametrically spanning and secured at its respective ends to the normally inward disposed end of the gas cap, said mounting handle having a recess projecting toward the adjacent end of the gas cap; and, resilient material overlying the surfaces defining the recesses.

* * * * *